May 9, 1939.  G. R. NAPIER  2,157,494
MEAT STUFFER
Filed Oct. 8, 1936
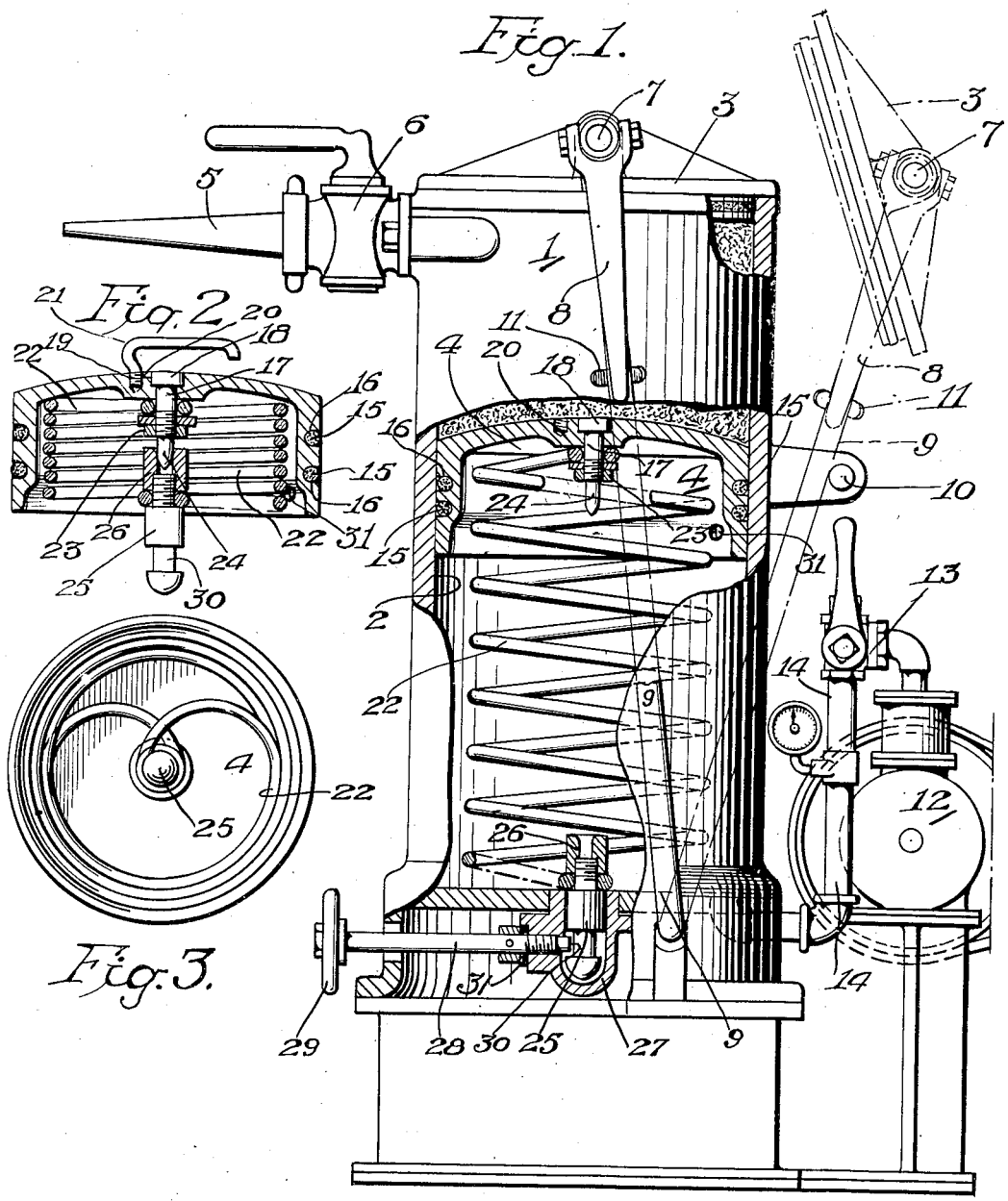
Inventor:—
George R. Napier
by his Attorneys
Howson & Howson Patented May 9, 1939

2,157,494

UNITED STATES PATENT OFFICE 2,157,494

MEAT STUFFER

George R. Napier, East Lansdowne, Pa.

Application October 8, 1936, Serial No. 104,717

8 Claims. (Cl. 17—39)

This invention relates to new and useful improvements in sausage and other meat stuffers and more particularly to stuffers of the power or pressure actuated piston type.

Up to the present time, in the majority of pressure actuated meat stuffers the weight of the piston has been depended upon to return said piston to its lowermost or inoperative position after the meat has been discharged from the stuffer and the pressure exhausted from the pressure side of the piston. In order to overcome the friction between the packing of the piston and the walls of the stuffing cylinder as well as the resistance offered by the tallow and other fats in the meat it will be obvious that these pistons must necessarily be of great weight. This of course presented a danger and risk of injury in the event the pistons were accidentally blown out of the cylinder and due to their excessive weight and the various complicated and ingenious schemes devised to prevent such blowouts the operators of these stuffers rarely if ever remove the pistons from the stuffers for cleaning purposes although in fact they should be removed and thoroughly cleaned at least once every day that the stuffer is used.

The principal object of the invention is to provide a meat stuffer of the character set forth wherein movement of the piston is effectively controlled to prevent blow-outs and at the same time effect return of said piston to inoperative position without the aid of gravity thus permitting a piston of relatively light weight to be employed.

Another object of the invention is to provide a piston operated meat stuffer of the stated character which is constructed and arranged to permit relatively easy rapid removal and replacement of said piston for cleaning purposes.

These and other objects of the invention and the features and details of construction thereof are set forth hereinafter and shown in the accompanying drawing, in which:

Figure 1 is a view in elevation partially in section of a stuffer made in accordance with the present invention.

Figure 2 is a view in section vertically through the piston and associated parts being removed from the stuffing cylinder; and Figure 3 is an inverted plan view of the disclosure in Figure 2.

Referring now to the drawing, reference numeral 1 designates generally a meat stuffer of the usual type comprising a cylinder 2 which is permanently closed at one end and provided with a removable cover member 3 at its other end. A piston 4 is reciprocable within the cylinder 2 and actuated in the usual manner by means of a suitable compressed gas, liquid or other fluid which is led into the cylinder 2 behind or below said piston to force meat placed in said cylinder outwardly thereof through one or more outlets such as 5 near the cover 3 and controlled by valves such as 6. The removable cover member 3 previously mentioned is suspended from an eccentric shaft 7 having a handle or lever 8 secured thereto and by means of which said eccentric shaft 7 may be rotated to elevate or lift the cover member 3 from the upper end of the stuffing cylinder 2, said cover member 3 being carried by pivotally mounted rods 9 for movement to the right with respect to Figure 1 of the drawing to a position resting against a stop 10 located laterally adjacent the stuffing cylinder 2. A latch 11 is provided and arranged for engagement by the handle or lever 8 when the cover member 3 is in closed position to lock the same and prevent accidental opening thereof.

The compressed gas, liquid or other fluid for actuating the piston 4 is led into the cylinder 2 below said piston 4 from a suitable compressor or pump 12 through a three-way valve 13 and a pipe line 14, said three-way valve 13 being connected in the pressure line 14 so that the interior of the cylinder 2 may be connected at will to the compressor or the surrounding atmosphere for the purpose of exhausting pressure from said cylinder.

The piston 4 is of the usual type having packing or rings 15 extending circumferentially thereof in grooves 16 to prevent dissipation of the compressed gas employed to actuate said piston and at least one port or opening 31 is formed in the side wall of the piston 4 adjacent the lower end edge thereof to provide a release or escape for pressure within the cylinder 2 below said piston 4 in the event that the latter is accidentally blown out of said cylinder 2 in a manner to be described hereinafter. As shown, the face of the piston 4 is slightly convex and a pin, stud or the like 17 is mounted axially thereof and extends or projects a substantial distance downwardly therefrom, downward displacement of said pin, stud or the like 17 being prevented by its head 18 which resides in a recess 19 countersunk in the upper face of the piston 4. In addition the head or face of the piston 4 is tapped as at 20 to receive the threaded portion of a handle or grip 21 for use in removing or lifting said piston 4 from the cylinder 2 for cleaning or other purposes.

One end of a coil spring 22 is looped about the pin or stud 17 at the underside of the piston 4 and secured thereto by any suitable means such as a nut or the like 23 threaded thereon, said pin or stud 17 being of such length that it extends appreciably below said nut 23 with its tip or end tapered as indicated at 24 for a purpose to be described hereinafter. The lower end of the coil spring 22 is looped about a stud 25, and secured thereto by a sleeve 26 threaded thereon. The stud 25 is mounted coaxially with respect to the pin 17 in a socket or recess formed by a housing 27 secured at the bottom of the cylinder 2, and the stud 25 is removably retained in said socket or recess by means of a rod or shaft 28 having threaded engagement with the housing 27 and rotatable by a hand wheel 29 into or out of engagement with a groove 30 adjacent the lower end thereof, said shaft 28 being packed as at 31 to prevent leakage of the compressed gas from the cylinder 2. The diameter of the bore of the sleeve 26 previously mentioned is arranged to receive the tapered end 24 of the pin 17 when the piston is in its lowermost position as shown in Figure 2 of the drawing for the purpose of maintaining the stud 25, piston 4 and its pin 17 substantially in alignment with each other and the ends of the coil spring 22 connected therebetween.

In operation of the device and assuming that the top or cover 3 is open and the cylinder 2 has been cleaned and oiled, the piston 4 and spring assembly shown in Fig. 2 may be placed within the cylinder by using the handle or grip 21. As the piston 4 reaches the bottom or lower end of the cylinder 2 the stud 25 is received by the housing 27 and secured therein against displacement by means of the shaft 28 which is actuated by the handwheel 29 into engagement with the notch or groove 30 in said stud 25. Sausage, meat, or other substance may now be packed into the cylinder 2 while top or cover 3 is open. After the meat has been placed within the cylinder 2 the cover 3 is then closed and locked by engaging handle 8 with the latch 11 and air or other compressed fluid is introduced into the cylinder 2 below piston 4 by opening the valve 13 and the piston is actuated thereto to discharge the meat under pressure outwardly of the ports or outlets 5, said discharge being controlled by operation of the valves 6 therein. As the piston 4 rises within the cylinder 2 the coiled spring 22 is expanded until said piston 4 reaches the top of said cylinder and all of the meat has been discharged, after which the valve 13 may be opened to shut off the compressed fluid and permit exhaust of the pressure within the cylinder to the surrounding atmosphere. The cover 3 may then be opened and the coil spring 22 will function to pull or return the piston 4 to the bottom or lower end of the cylinder ready for the next stuffing operation.

In addition to the function of returning the piston 4 to the lowermost or inoperative position at the completion of a stuffing operation the spring 22 performs another equally important function in that it acts as a definite connection between said piston and its cylinder 2 to prevent blowing out of the former in the event that pressure is accidentally supplied to said cylinder when the cover 3 is unlocked or open and eliminates the danger of injury to the operator or other persons. In this connection the spring 22 will allow the piston 4 to emerge from the open end of the cylinder 2 until the previously mentioned port or aperture 31 therein is exposed or uncovered at which time the pressure actuating said piston 4 will be released or discharged outwardly through said port or opening 31 to the surrounding atmosphere and prevent further displacement of said piston outwardly from said cylinder 2 which might result in injury to the operator or other persons. After the actuating pressure behind the piston 4 has been released or discharged outwardly through the port or opening 31 in the foregoing manner the said spring 22, affording a resilient connection between said piston 4 and the lower end of the cylinder, will function to withdraw the piston inwardly of said cylinder and return the same to its lowermost or inoperative position.

While a specific embodiment of the invention has been illustrated and described, it is not intended that said invention shall be precisely limited thereto, but that changes and modifications in the construction and arrangement thereof may be incorporated within the scope of the annexed claims.

I claim:

1. In a pressure operated stuffing device of the character described including a cylinder and a piston slidable therein, a coil spring in said cylinder between the piston and the pressure end of the cylinder, a member connecting one end of said coil spring to said piston centrally thereof, a locking element secured to the other end of the spring, means providing a recess outwardly adjacent the pressure end of the cylinder to receive said locking element, a member extending inwardly of said recess operative at will to releasably engage the locking element therein and detachably connect the same and the adjacent end of the spring to the pressure end of the cylinder so that said spring tends to oppose operative movement of the piston and return the same to inoperative position at the completion of a stuffing operation, and means forming a part of both the locking element and the member connecting the other end of the spring to the piston constructed and arranged for cooperative interengagement upon contraction of said spring so that the same and said locking element are properly centered with respect to the piston when the locking element is released to permit the piston and spring to be removed from the cylinder.

2. In a pressure operated stuffing device of the character described including a cylinder and a piston slidable therein, a coil spring in said cylinder between the piston and the pressure end of the cylinder, a member connecting one end of said coil spring to said piston centrally thereof, a locking element secured to the other end of the spring, means providing a recess outwardly adjacent the pressure end of the cylinder to receive said locking element, and a member extending inwardly of said recess operative at will to releasably engage the locking element therein and detachably connect the same and the adjacent end of the spring to the pressure end of the cylinder so that said spring tends to oppose operative movement of the piston and return the same to inoperative position at the completion of a stuffing operation.

3. In a pressure operated stuffing device of the character described including a cylinder and a piston slidable therein, a coil spring in said cylinder between the piston and the pressure end of the cylinder, a member connecting one end of said coil spring to said piston centrally thereof, a locking element secured to the other end of the spring, a member operative at will to releasably engage the locking element therein and detachably connect the same and the adjacent end of the spring to the pressure end of the cylinder so that said spring tends to oppose operative movement of the piston and return the same to inoperative position at the completion of a stuffing operation, and means forming a part of both the locking element and the member connecting the other end of the spring to the piston constructed and arranged for cooperative interengagement upon contraction of said spring so that the same and said locking element are properly centered with respect to the piston when the locking element is released to permit the piston and spring to be removed from the cylinder.

4. In a pressure operated stuffing device of the character described including a cylinder and a piston slidable therein, a coil spring in said cylinder between the piston and the pressure end of the cylinder, a member connecting one end of said coil spring to said piston centrally thereof, a locking element secured to the other end of the spring, a member operative at will to releasably engage the locking element therein and detachably connect the same and the adjacent end of the spring to the pressure end of the cylinder so that said spring tends to oppose operative movement of the piston and return the same to inoperative position at the completion of a stuffing operation, and means providing a recess in the locking element arranged to receive a portion of the member connecting the other end of the spring to the piston upon contraction of said spring so that the same and said locking element are properly centered with respect to said piston when the locking element is released to permit the piston and spring to be removed from the cylinder.

5. In a stuffing device of the character described, an assembly including an inverted substantially cup-shaped piston, a coil spring arranged when contracted to nest upwardly within said piston, a member connecting one end of said spring to the piston centrally thereof and having a projection thereon extending axially of said piston, and a locking element having the other end of the spring connected thereto, said locking element having a recess therein arranged to receive said projection on the member connecting said spring to the piston when the spring nests within the latter so that said spring and locking element may be maintained in properly centered relation with respect to said piston.

6. In a stuffing device of the character described including a cylinder, an assembly arranged to slide within said cylinder including an inverted substantially cup-shaped piston, a coil spring arranged when contracted to nest upwardly within said piston, a member connecting one end of said spring to the piston centrally thereof and having a projection thereon extending axially of said piston, a locking element having the other end of the spring connected thereto, said locking element having a recess therein arranged to receive said projection on the member connecting said spring to the piston when the spring nests within the latter so that said spring and locking element may be maintained in properly centered relation with respect to said piston, means providing a socket at the bottom of said cylinder arranged to receive the locking element, and a member operable at will to releasably engage said locking member when in said socket and detachably anchor the same and the adjacent end of the spring at the bottom of said cylinder.

7. In a stuffing device of the character described including a cylinder, an assembly arranged to slide within said cylinder including an inverted substantially cup-shaped piston, a coil spring arranged when contracted to nest upwardly within said piston, a member connecting one end of said spring to the piston centrally thereof and having a projection thereon extending axially of said piston, a locking element having the other end of the spring connected thereto, said locking element having a recess therein arranged to receive said projection on the member connecting said spring to the piston when the spring nests within the latter so that said spring and locking element may be maintained in properly centered relation with respect to said piston, means providing a socket at the bottom of said cylinder arranged to receive the locking element, and a member extending inwardly of the socket from the exterior of the cylinder operable at will to releasably engage said locking member when in said socket and detachably anchor the same and the adjacent end of the spring at the bottom of said cylinder.

8. In a stuffing device of the character described including a chamber, an inverted substantially cup-shaped piston arranged to slide within said chamber, coil spring connected to said piston at the pressure side thereof and arranged when contracted to nest upwardly within the piston, a locking element having the other end of said spring connected thereto, and mechanism arranged externally of the pressure end of the chamber operative at will to releasably engage said locking element and anchor the same and the adjacent end of the spring at said end of the chamber.

GEORGE R. NAPIER.